(12) United States Patent
Hody

(10) Patent No.: US 7,985,067 B2
(45) Date of Patent: Jul. 26, 2011

(54) COMPACT RADIANT BURNER DEVICE WITH TWO HEATING SURFACES, AND APPLICATION

(75) Inventor: Stephane Hody, Bry sur Marne (FR)

(73) Assignees: Gaz de France, Paris (FR); Commissariat à l'Energie Atomique, Paris (FR)

( * ) Notice: Subject to any disclaimer, the term of this patent is extended or adjusted under 35 U.S.C. 154(b) by 837 days.

(21) Appl. No.: 11/944,148

(22) Filed: Nov. 21, 2007

(65) Prior Publication Data

US 2008/0131746 A1    Jun. 5, 2008

(30) Foreign Application Priority Data

Nov. 24, 2006 (FR) ..................... 06 10331

(51) Int. Cl.
*F23D 14/04* (2006.01)
*F23D 14/16* (2006.01)
*H01M 8/04* (2006.01)

(52) U.S. Cl. ............ 431/328; 431/7; 431/200; 431/201; 126/92 R; 126/92 AC; 126/92 B; 429/433; 429/434; 429/435; 429/436

(58) Field of Classification Search .............. 431/7, 328; 126/92 R, 92 AC, 92 B
See application file for complete search history.

(56) References Cited

U.S. PATENT DOCUMENTS

| | | | | |
|---|---|---|---|---|
| 1,939,941 A | * | 12/1933 | Ahern | ............................ 431/201 |
| 2,621,721 A | | 6/1949 | Manteria | |
| 4,632,658 A | * | 12/1986 | Petersen | ........................ 431/208 |
| 4,729,931 A | * | 3/1988 | Grimble | ........................ 429/415 |
| 4,878,837 A | * | 11/1989 | Otto | .............................. 431/328 |
| 5,355,841 A | | 10/1994 | Moore, Jr. et al. | |
| 5,356,487 A | * | 10/1994 | Goldstein et al. | ............. 136/253 |
| 2005/0214613 A1 | * | 9/2005 | Sarkar et al. | .................... 429/31 |

FOREIGN PATENT DOCUMENTS

| BE | 1005739 | | 1/1994 |
|---|---|---|---|
| JP | 61-143613 | * | 12/1984 |

OTHER PUBLICATIONS

A definition of the "cylinder of revolution", A Textbook of Geometry, GA Wentworth, Ginn & Company, 1898, p. 319.*
Mital R., et al., "High efficiency multifuel combustor with potential for commercial and military applications", IECEC '97, Proceedings of the 32nd Intersociety Energy Conversion Engineering Conference, Energy Systems, Renewable Energy Resources, Environmental Impact and Policy Impacts on Energy, Honolulu, HI, Jul. 27, 1997, pp. 949-954.

* cited by examiner

*Primary Examiner* — Cynthia Lee
(74) *Attorney, Agent, or Firm* — Miles & Stockbridge P.C.; James T. Carmichael, Esq.; Michael A. Minter, Esq.

(57) ABSTRACT

The invention relates to a radiant gas burner device comprising a first cylindrical chamber (1) and a first injector (2) for feeding the first chamber with a combustible gas mixture, the first chamber (1) comprising an external peripheral heating surface (10).
The device of the invention further comprises a second cylindrical and hollow second chamber, and a second injector (4) for feeding the second chamber with a combustible gas mixture, the second chamber being positioned inside the first chamber (1), separated from the first chamber by a sealed wall, and having an internal heating surface (30), and the first and second injectors (2, 4) being designed for separately feeding the first and second chambers, independently of each other.

18 Claims, 1 Drawing Sheet

COMPACT RADIANT BURNER DEVICE WITH TWO HEATING SURFACES, AND APPLICATION

The invention generally relates to the field of energy and notably exploitation of gas.

More specifically, the invention relates to a radiant gas burner device comprising a first cylindrical chamber and a first injector for feeding the first chamber with a combustible gas mixture, the first chamber comprising an external peripheral heating surface.

A burner of this type is for example described in patent document BE 1 005 739.

To each burner geometry correspond specific heating characteristics, related to how the heat is concentrated and how it is dispersed.

In some applications, which require the use of different heating characteristics, it is therefore necessary to provide burners with different geometries.

Thus, this requirement traditionally leads to an arrangement of burners for which the total bulk space is larger than the sum of the bulk spaces of the different burners.

The object of the present invention which is located within this context is to propose a burner device free from this defect.

For this purpose, the burner of the invention, moreover complying with the generic definition as given by the preamble above, is essentially characterized in that it further comprises a second cylindrical and hollow chamber, and a second injector for feeding the second chamber with a combustible gas mixture, in that the second chamber is positioned inside the first chamber, is separated from this first chamber by a wall closing the first and second chambers, and has an internal heating surface, and in that the first and second injectors are designed for feeding the first and second chambers separately and independently of each other.

The first and second chambers are preferably coaxial, each of the first and second chambers being further conformed as a cylinder of revolution, for example.

The invention also relates to the application of the device as defined earlier to a stand-alone facility for producing heat and electricity, using a fuel cell.

In this application, the fuel cell may be located inside the internal heating surface.

Further, the installation may comprise a heat exchanger surrounding the external peripheral heating surface and therefore receiving the whole heat flow produced by this external heating surface.

Other features and advantages of the invention will become clearly apparent from the description which is made thereof hereafter, as an indication and by no means as a limitation, with reference to the appended drawings, wherein.

Figure 1:
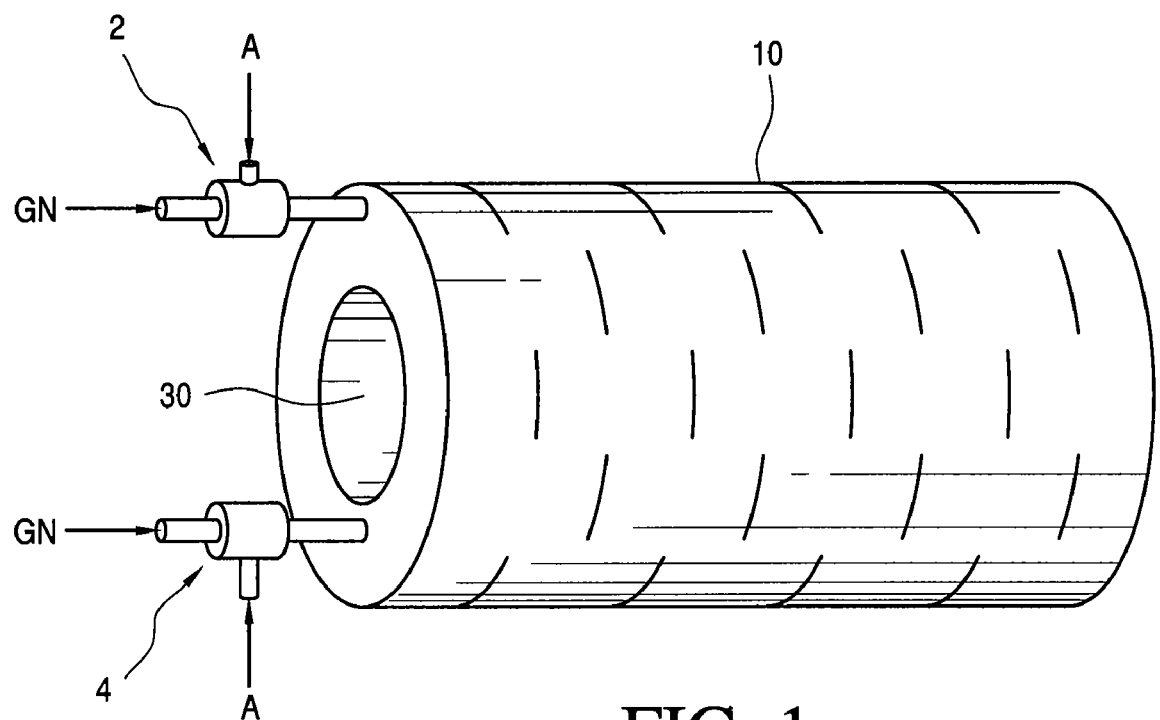
FIG. 1 is a schematic perspective view of the device on the invention.
Figure 2:
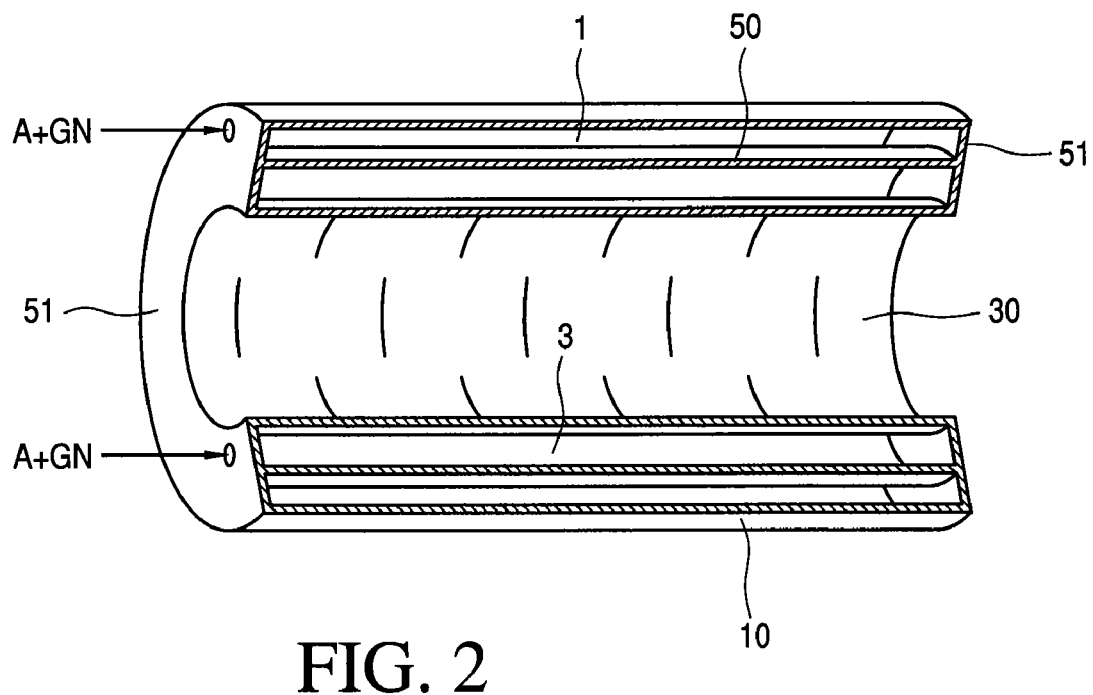
FIG. 2 is a cut-away view of the device illustrated in FIG. 1.

As announced earlier, the invention relates to a radiant gas burner device comprising a cylindrical chamber 1 and an injector 2 for feeding this chamber with a combustible gas mixture, for example consisting of air A and of natural gas GN.

The chamber 1 is sealed by a cylindrical wall 50 and by front walls 51 and has an external peripheral heating surface 10 for example consisting of braided steel wires, of a pierced steel or ceramic plate.

The device of the invention further comprises a second chamber 3 and a second injector 4 for feeding the gas mixture, dedicated to this second chamber 3.

The second chamber 3, which is cylindrical, hollow, and located inside the first chamber 1, is sealed by the cylindrical wall 50 and the front walls 51, and has an internal heating surface 30 for example consisting of braided steel wires, of a pierced steel or ceramic plate.

The chambers 1 and 3 are for example coaxial and each of them essentially assumes the shape of a cylinder of revolution.

Moreover, the injectors 2 and 4 for feeding the fuel mixture are designed so as to separately feed the chambers 1 and 3, independently of each other.

It is thus possible to separately adjust the heat flows produced by the heating surfaces 10 and 30, respectively.

Considering the different geometries of the heating surfaces 10 and 30, the heat flows respectively produced by these surfaces have different dissipation properties, the heat flow from the external surface 10 has a large temperature gradient whereas the heat flow from the internal surface 30 is favorable to obtaining a high and homogenous temperature.

The device of the invention thus proves to be ideally applicable to making a stand-alone facility for producing heat and electricity, using a fuel cell, the fuel cell being placed inside the internal heating surface 30 and the external heating surface 10 being placed inside a heat exchanger with which this facility is equipped.

The invention claimed is:

1. A radiant gas burner device comprising:
   a first cylindrical chamber and a first injector configured to feed the first chamber with a combustible gas mixture, the first chamber comprising an external peripheral heating surface;
   a second cylindrical and hollow chamber and a second injector configured to feed the second chamber with a combustible gas mixture,
   wherein the second chamber is positioned inside the first chamber, is separated from the first chamber by a wall closing the first and second chambers, and has an internal heating surface,
   wherein each of the first and second chambers is sealed by the wall closing the first and second chambers, and by a first wall and a second wall disposed at respective ends of the wall closing the first and second chambers, and
   wherein the first and second injectors are configured to feed separately the first and second chambers independently of each other.

2. The radiant burner device according to claim 1, wherein the first and second chambers are coaxial.

3. The radiant burner device according to claim 1, wherein each of the first and second chambers is formed as a cylinder of revolution.

4. The radiant burner device according to claim 1, wherein the radiant burner device is configured to be used with a facility for producing heat and electricity, using a fuel cell.

5. The radiant burner device according to claim 4, wherein the fuel cell is positioned inside the internal heating surface.

6. The radiant burner device according to claim 1, further comprising a heat exchanger surrounding the external peripheral heating surface.

7. A radiant gas burner device comprising:
   a first cylindrical chamber and a first injector configured to feed the first chamber with a combustible gas mixture, the first chamber having an external peripheral heating surface;
   a second cylindrical and hollow chamber and a second injector configured to feed the second chamber with a combustible gas mixture, wherein the second chamber is positioned inside the first chamber, is separated from the first chamber by a wall configured between the first and second chambers, and has an internal heating surface, wherein each of the first and second chambers is sealed by the wall configured between the first and second chambers, and by a first wall and a second wall disposed at respective ends of the wall configured between the first and second chambers, and wherein the first and second injectors are configured to feed separately the first and second chambers, respectively, independently of each other.

8. The radiant burner device according to claim 7, wherein the first and second chambers are coaxial.

9. The radiant burner device according to claim 7, wherein each of the first and second chambers is cylindrical.

10. The radiant burner device according to claim 7, wherein the radiant burner device is configured to be used with a facility that produces heat and electricity, using a fuel cell.

11. The radiant burner device according to claim 10, wherein the fuel cell is positioned inside the internal heating surface.

12. The radiant burner device according to claim 7, further comprising a heat exchanger surrounding the external peripheral heating surface.

13. An apparatus that produces heat and electricity using a fuel cell, comprising:

a fuel cell; and a radiant gas burner device, the radiant gas burner device comprising:

a first cylindrical chamber and a first injector configured to feed the first chamber with a combustible gas mixture, the first chamber including an external peripheral heating surface;

a second cylindrical and hollow chamber and a second injector configured to feed the second chamber with a combustible gas mixture, wherein the second chamber is positioned inside the first chamber, is separated from the first chamber by a wall configured between the first and second chambers, and has an internal heating surface, wherein each of the first and second chambers is sealed by the wall configured between the first and second chambers, and by a first wall and a second wall disposed at respective ends of the wall configured between the first and second chambers, wherein the first and second injectors are configured to feed separately respective first and second chambers independently of each other, and wherein the fuel cell is positioned inside the internal heating surface.

14. The apparatus that produces heat and electricity using a fuel cell according to claim 13, wherein the radiant gas burner device further comprises a heat exchanger surrounding the external peripheral heating surface.

15. The apparatus that produces heat and electricity using a fuel cell according to claim 13, wherein the first and second chambers are coaxial.

16. The apparatus according to claim 13, wherein each of the first and second chambers is formed as a cylinder of revolution.

17. The apparatus according to claim 13, wherein the first and second injectors are disposed on a circular wall which is disposed at an end of the wall configured between the first and second chambers.

18. The apparatus according to claim 17, wherein the circular wall is one of three walls configured to seal each of the first and second chambers.

\* \* \* \* \*